US009769706B2

(12) United States Patent
Prakash et al.

(10) Patent No.: US 9,769,706 B2
(45) Date of Patent: Sep. 19, 2017

(54) RESOURCE RESERVATION FOR HANDOVER SIGNALING

(71) Applicant: QUALCOMM Incorporated, San Diego, CA (US)

(72) Inventors: Rajat Prakash, San Diego, CA (US); Chirag Sureshbhai Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 14/075,915

(22) Filed: Nov. 8, 2013

(65) Prior Publication Data

US 2014/0219244 A1 Aug. 7, 2014

Related U.S. Application Data

(60) Provisional application No. 61/762,232, filed on Feb. 7, 2013.

(51) Int. Cl.
*H04L 1/00* (2006.01)
*H04W 36/00* (2009.01)
*H04W 28/26* (2009.01)
*H04W 84/04* (2009.01)
*H04W 72/04* (2009.01)

(52) U.S. Cl.
CPC ........... *H04W 36/0005* (2013.01); *H04L 1/00* (2013.01); *H04W 36/0016* (2013.01); *H04W 28/26* (2013.01); *H04W 72/044* (2013.01); *H04W 84/045* (2013.01)

(58) Field of Classification Search
CPC ..... H04W 80/04; H04W 80/05; H04W 80/06; H04W 80/07; H04W 80/08; H04W 72/04; H04W 72/05; H04W 72/06

USPC ................ 370/329, 330, 331, 333
See application file for complete search history.

(56) References Cited

U.S. PATENT DOCUMENTS 7,808,951 B2 10/2010 Choi et al.
2008/0268850 A1* 10/2008 Narasimha et al. .......... 455/437
2010/0278141 A1 11/2010 Choi-Grogan et al.
(Continued)

FOREIGN PATENT DOCUMENTS

WO WO-2012116709 A1 9/2012
WO 2012139624 A1 10/2012
WO WO-2012134178 A2 10/2012

OTHER PUBLICATIONS

3GPP TSG-RAN WG2 Meeting #75bis by St. Julain's Malta Mar. 2007.*
International Search Report and Written Opinion—PCT/US2014/015017—ISA/EPO—Jun. 24, 2014.

*Primary Examiner* — Dady Chery

(57) ABSTRACT

Resources are reserved for handover signaling. Handover reliability is thereby improved since the primary interference for handover signaling will be from the handover signaling of nearby cells (e.g., as opposed to data traffic). Given the relatively sparse nature of handover signaling, a significant reduction in interference may be achieved in a network employing this technique in comparison to conventional networks. In some implementations, a set of neighboring access points cooperate to determine which resources are reserved for handover signaling. In some implementations, resources for handover signaling are reserved on a network-wide basis or an access point cluster-wide basis.

32 Claims, 14 Drawing Sheets

(56) References Cited

U.S. PATENT DOCUMENTS

2011/0300891 A1 12/2011 Deb et al.
2012/0039195 A1 2/2012 Jung et al.

* cited by examiner

RESOURCE RESERVATION FOR HANDOVER SIGNALING

CROSS-REFERENCE TO RELATED APPLICATIONS

The present application for patent claims the benefit of U.S. Provisional Application No. 61/762,232, entitled "RESOURCE RESERVATION FOR HANDOVER SIGNALING," filed Feb. 7, 2013, assigned to the assignee hereof, and expressly incorporated herein by reference in its entirety.

BACKGROUND

This application relates generally to wireless communication and more specifically, but not exclusively, to handover signaling.

A wireless communication network may be deployed to provide various types of services (e.g., voice, data, multimedia services, etc.) to users within a geographical area. In a typical implementation, macro access points (e.g., corresponding to different macro cells) are distributed throughout a network to provide wireless connectivity for access terminals (e.g., cell phones) that are operating within the geographical area served by the network. Core network entities support connectivity between access points, access to other networks (e.g., the Internet), management functions, and other related functions.

In some networks, low-power access points (e.g., femto cells) are deployed to supplement conventional network access points (e.g., macro access points). For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). In general, these low-power access points provide more robust coverage and higher throughput for access terminals in the vicinity of the low-power access points.

At a given point in time, an access terminal may be served by a given one of the access points of a network. As the access terminal roams throughout the network area, the access terminal may move away from its serving access point and move closer to another access point. In addition, signal conditions within a given cell may change, whereby an access terminal may be better served by another access point. In either of these cases, to maintain mobility for the access terminal, the access terminal may be handed-over from its serving access point to the other access point.

Handover of an access terminal (e.g., UE) may be adversely affected if handover signaling is subjected to interference. For example, in a network with a dense concentration of access points (e.g., femto cells) and a high rate of handover, handover signaling may suffer from low signal-to-noise-and-interference ratio (SINR) at the intended receiver due to interference from nearby cells and/or access terminals. Consequently, handover failure may occur relatively frequently in such a scenario.

SUMMARY

A summary of several sample aspects of the disclosure follows. This summary is provided for the convenience of the reader to provide a basic understanding of such aspects and does not wholly define the breadth of the disclosure. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. For convenience, the term some aspects may be used herein to refer to a single aspect or multiple aspects of the disclosure.

The disclosure relates in some aspects to reserving resources for handover signaling. Handover reliability is thereby improved since the primary (or only) interference to handover signaling will be from the handover signaling of nearby cells (e.g., as opposed to data traffic of nearby cells). Given the relatively sparse nature of handover signaling, a significant reduction in interference may be achieved in a network employing the disclosed resource reservation technique in comparison to conventional networks.

In various implementations, a set of neighboring access points cooperate to determine which resources are reserved for handover signaling, or resources for handover signaling are reserved on a network-wide basis. In the latter case, a network operator may pre-determine the resources that are to be used for handover signaling, whereby access points and access terminals deployed in the network are pre-configured with this resource information. In either case, each access point may transmit resource grant messages to served access terminals to inform the access terminals of the resources on which handover signaling is to be transmitted. Consequently, access terminals in the network will know where to look for handover signaling, even if the access terminals are not able to receive resource grant messages (or other similar messages) from the access points in the network due to poor signal conditions.

A specific example of resource reservation in an LTE system follows. In such a case, physical resource blocks (PRBs) may be reserved for transmission of handover signaling. In addition, for a deployment that uses pre-configured resource reservation, handover signaling may be sent using a fixed configuration. For example, the physical downlink shared channel (PDSCH) and/or the physical downlink control channel (PDCCH) may be reserved with respect to certain fixed orthogonal frequency-division multiplexing (OFDM) symbols or resources, fixing signal rank, modulating the order of signals, or a combination of these factors.

The teachings herein may be embodied and/or practiced in different ways in different implementations.

In some aspects, an apparatus for communication in accordance with the teachings herein comprises: a processing system configured to determine a reserved resource for handover command transmission, and further configured to determine to handover an access terminal, wherein the determination to handover the access terminal occurs after the determination of the reserved resource; and a transmitter configured to transmit a handover command over the reserved resource to the access terminal as a result of determination to handover the access terminal.

In some aspects, a method of communication in accordance with the teachings herein comprises: determining a reserved resource for handover command transmission; determining to handover an access terminal, wherein the determination to handover the access terminal occurs after the determination of the reserved resource; and transmitting a handover command over the reserved resource to the access terminal as a result of determination to handover the access terminal.

In some aspects, an apparatus for communication in accordance with the teachings herein comprises: means for determining a reserved resource for handover command transmission; means for determining to handover an access terminal, wherein the determination to handover the access terminal occurs after the determination of the reserved resource; and means for transmitting a handover command over the reserved resource to the access terminal as a result of determination to handover the access terminal.

In some aspects, a computer-program product in accordance with the teachings herein comprises computer-readable medium comprising code for causing a computer to: determine a reserved resource for handover command transmission; determine to handover an access terminal, wherein the determination to handover the access terminal occurs after the determination of the reserved resource; and transmit a handover command over the reserved resource to the access terminal as a result of determination to handover the access terminal.

BRIEF DESCRIPTION OF THE DRAWINGS

These and other sample aspects of the disclosure will be described in the detailed description and the claims that follow, and in the accompanying drawings, wherein:

Figure 1:
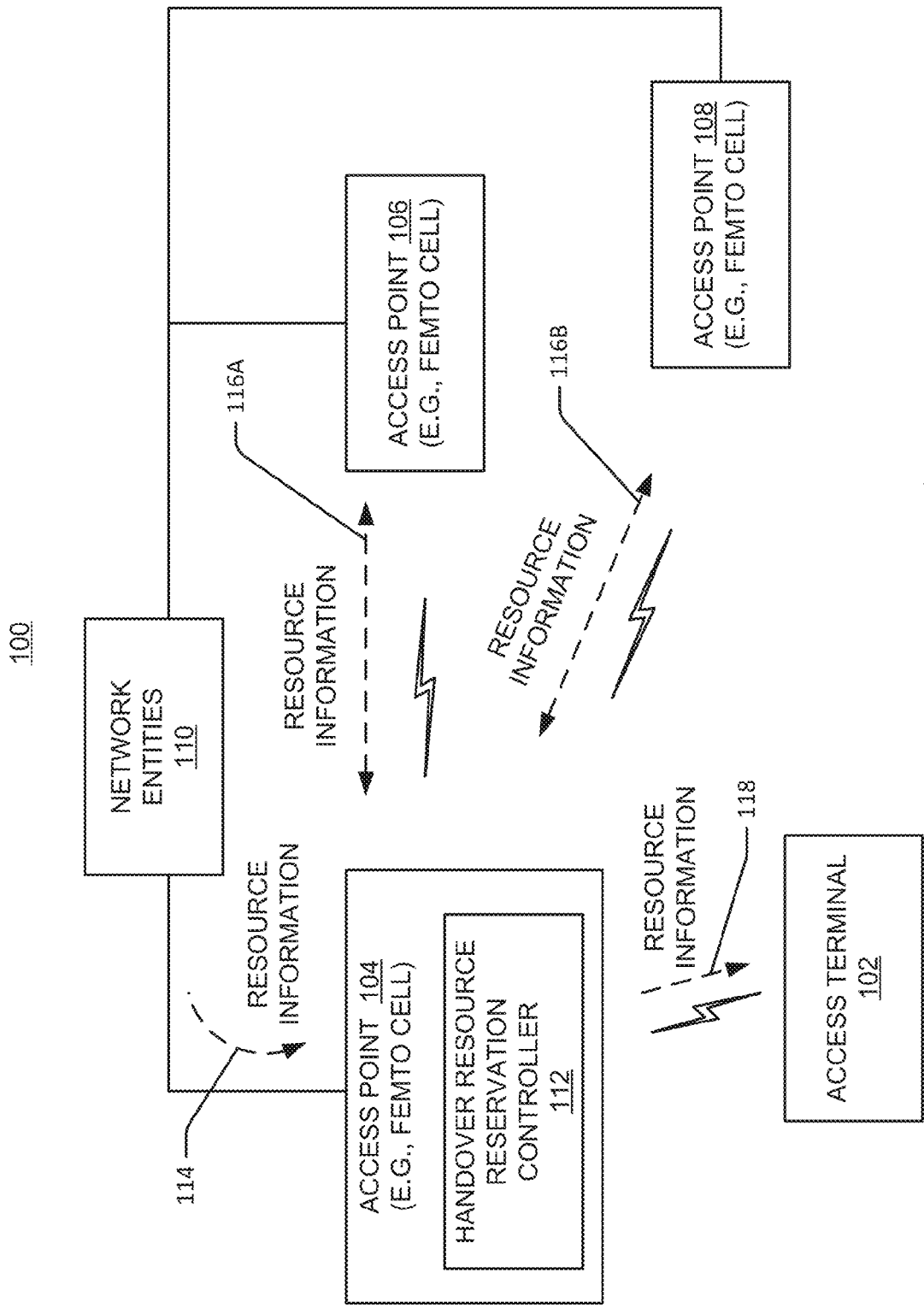
FIG. 1 is a simplified block diagram of several sample aspects of a communication system adapted to support resource reservation.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The disclosure relates in some aspects to reserving a resource to be used by a set of wireless nodes for handover signaling. For example, frequency spectrum or time slots may be allocated solely for handover signaling, such that the wireless nodes will not use this allocated resource for data traffic and other non-handover signaling. Consequently, handover signaling between the wireless nodes may be subject to less interference as compared to conventional handover schemes that use the same resource for handover signaling and non-handover signaling.

In accordance with some aspects of the disclosure, a handover resource is reserved for a set of wireless nodes before the wireless nodes perform handover operations. Once handover of a given wireless node is warranted, the wireless nodes use the reserved resource for signaling associated with the handover. For example, a source access point will send a handover command via the reserved resource to an access terminal that is to be handed-over to a target access point. Given the relatively low interference on the reserved resource, the access terminal will reliably receive the handover command, even when other resources (e.g., used for data traffic) are subject to relatively high levels of interference. Consequently, in contrast to conventional handover schemes, a handover scheme that uses a reserved resource in accordance with the teachings herein may experience fewer handover failures.

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, any aspect disclosed herein may be embodied by one or more elements of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, Home NodeBs, Home eNodeBs, small cells, macro cells, femto cells, and so on, while access terminals may be referred to or implemented as user equipment (UEs), mobile stations, and so on.

Access points in the system 100 provide access to one or more services (e.g., network connectivity) for one or more wireless terminals (e.g., access terminal 102) that may be installed within or that may roam throughout a coverage area of the system 100. For example, at various points in time the access terminal 102 may connect to an access point 104, an access point 106, an access point 108, or some other access point in the system 100 (not shown).

Each of the access points may communicate with one or more network entities (represented, for convenience, by the network entities 110), including each other, to facilitate wide area network connectivity. Two or more of such network entities may be co-located and/or two or more of such network entities may be distributed throughout a network.

A network entity may take various forms such as, for example, one or more radio and/or core network entities. Thus, in various implementations the network entities 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

Some of the access points (e.g., the access point 104) in the system 100 may comprise low-power access points. Various types of low-power access points may be employed in a given system. For example, low-power access points may be implemented as or referred to as femto cells, femto access points, small cells, femto nodes, home NodeBs (HNBs), home eNodeBs (HeNBs), access point base stations, pico cells, pico nodes, or micro cells. Typically, low-power access points connect to the Internet via a broadband connection (e.g., a digital subscriber line (DSL) router, a cable modem, or some other type of modem) that provides a backhaul link to a mobile operator's network. Thus, a low-power access point deployed in a user's home or business provides mobile network access to one or more devices via the broadband connection.

As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in the coverage area. In some implementations, each low-power access point has a transmit power (e.g., as defined above) that is less than a transmit power (e.g., as defined above) of the macro access point by a relative margin (e.g., 10 dBm or more). In some implementations, low-power access points such as femto cells may have a maximum transmit power of 20 dBm or less. In some implementations, low-power access points such as pico cells may have a maximum transmit power of 24 dBm or less. It should be appreciated, however, that these or other types of low-power access points may have a higher or lower maximum transmit power in other implementations (e.g., up to 1 Watt in some cases, up to 10 Watts in some cases, and so on).

For convenience, low-power access points may be referred to simply as small cells in the discussion that follows. Thus, it should be appreciated that any discussion related to small cells herein may be equally applicable to low-power access points in general (e.g., to femto cells, to micro cells, to pico cells, etc.).

Small cells may be configured to support different types of access modes. For example, in an open access mode, a small cell may allow any access terminal to obtain any type of service via the small cell. In a restricted (or closed) access mode, a small cell may only allow authorized access terminals to obtain service via the small cell. For example, a small cell may only allow access terminals (e.g., so called home access terminals) belonging to a certain subscriber group (e.g., a closed subscriber group (CSG)) to obtain service via the small cell. In a hybrid access mode, alien access terminals (e.g., non-home access terminals, non-CSG access terminals) may be given limited access to the small cell. For example, a macro access terminal that does not belong to a small cell's CSG may be allowed to access the small cell only if sufficient resources are available for all home access terminals currently being served by the small cell.

Thus, small cells operating in one or more of these access modes may be used to provide indoor coverage and/or extended outdoor coverage. By allowing access to users through adoption of a desired access mode of operation, small cells may provide improved service within the coverage area and potentially extend the service coverage area for users of a macro network.

As mentioned above, handover robustness may be a problem in dense networks with high handover rates and challenging radio environments. Dense networks with multiple access points can cause a high signal interference and noise ratio (e.g., SINR), which can result in lost handover signaling messages and dropped calls.

To improve reliability of the handover process (e.g., to reduce the number of dropped calls), the system 100 is configured to manage handovers of an access terminal served by an access point by reserving resources for transmission of handover signaling. The reserved resources may include frequency domain resources and/or time domain resources. For example, in LTE, physical resource blocks (PRBs) may be reserved for transmission of handover commands, to the exclusion of any other traffic. Thus, handover of access terminals (e.g., on active calls or on data connections) may be more reliable since the handover commands will be subjected to less interference.

As illustrated in FIG. 1, the access point 104 includes a handover resource reservation controller 112 for managing the reservation of resources for handovers by the access point 104. It should be appreciated that at some of the other access points in the system will have similar functionality (not shown). Two examples of resource reservation signaling are illustrated in FIG. 1.

In a first example, the reserved handover resources are specified by the network operator. In this case, the network operator selects the resources to be used by the access point 104 and sends information indicative of the reserved resources to the access point 104. This signaling is represented in FIG. 1 by the resource information flow 114. As discussed in more detail below, resources may be reserved, for example, on a network-wide basis or on an access point cluster basis.

In a second example, the access point 104 communicates (e.g., negotiates) with at least one neighbor access point (e.g., the access points 106 and 108) to reserve resources for handover signaling. For example, all of the access points in a cluster may agree to reserve a particular resource for handover signaling. This signaling is represented in FIG. 1 by the resource information flow 116A and 116B.

In either case, once a resource is reserved, each access point may send information indicative of the reserved resource to its served access terminals. In the example of FIG. 1, this is illustrated by the access point 104 transmitting resource information 118 to the access terminal 102.

In some cases, resource reservation may be achieved through the use of reservation capabilities supported by the wireless technology of the corresponding implementation. For example, in an LTE-based system, semi-persistent scheduling may be used to schedule resources for handover in accordance with the teachings herein.

In view of the above, resources may be reserved for transmission of handover signaling, with an objective to improve handover signaling reliability. Using such reserved resources, the primary (or only) inter-cell interference will be between handover signaling messages. Given the sparse nature of these messages, good interference reduction will likely be achieved.

For added reliability, when an access terminal is in a handover region, the system may be configured such that an access point sends control and data using a fixed configuration (e.g., PDSCH on certain fixed OFDM symbols and/or resource elements, data with fixed rank, a modulation order, etc.). In this case, the access point and access terminal can be configured to a known fixed configuration beforehand. As such, even if some control channels cannot be decoded reliably, the access terminal knows the information needed for control and data decoding.

Sample operations relating to resource reservation and access terminal handover will now be described in conjunction with the flowchart of FIG. 2. For convenience, the operations of FIG. 2 (or any other operations discussed or taught herein) may be described as being performed by specific components (e.g., components of FIG. 1, FIG. 3, or FIG. 9). It should be appreciated, however, that these operations may be performed by other types of components and may be performed using a different number of components. It also should be appreciated that one or more of the operations described herein may not be employed in a given implementation.

As represented by block 202, a reserved resource for handover command transmission is determined. As discussed herein, a reserved resource may be a frequency domain resource, a time domain resource, or both. As a specific example, a reserved resource may be an LTE physical resource block.

The specific resource(s) to be used for handover may be selected by, for example, a network operator, by an access point (e.g., in cooperation with at least one other access point), or by some other entity. Accordingly, the determination of block 202 may take various forms depending on how the resource was reserved. For example, an access point may determine what resource was specified by a network operator (e.g., by receiving resource information or by retrieving resource information that the access point previously stored). As another example, an access point may specify the resource or cooperate with another entity (e.g., an access point) to specify the resource.

In view of the above, several examples of the determination of block 202 follow. In some aspects, the determination of the reserved resource may comprise storing information indicative of the reserved resource. In some aspects, the determination of the reserved resource may comprise communicating with at least one access point of a cluster of access points to select the resource. In some aspects, the determination of the reserved resource may comprise receiving information indicative of the reserved resource.

In some implementations, the determination of the reserved resource comprises determining a pre-determined reserved resource (e.g., receiving an indication of the pre-determined reserved resource, retrieving an indication of the pre-determined reserved resource from a memory device, etc.). In some cases, the determination of the pre-determined reserved resource may further comprise determining a network-wide configuration. Alternatively, in an implementation where different pre-determined reserved resources are defined for different clusters of access points, the determination of the pre-determined reserved resource may further comprise identifying one of the access point clusters and determining which one of the pre-determined reserved resources is defined for the identified cluster.

As represented by optional block 204, information indicative of the resource reservation may be transmitted to an access terminal prior to the transmission of a handover command to the access terminal. Thus, information indicative of a reserved resource for handover is stored at the access terminal in advance of a time slot in which the transmission of the handover command occurs. In this way, the access terminal may be configured to monitor specific resources for handover commands.

As a specific example, an access point may generate a resource grant, wherein the resource grant includes information about the reserved resource and handover timing information. The access point may then transmit the resource grant to each of its served access terminals prior to the transmission of a handover command to any of those access terminals. Thus, in this case, control information that may be sent via communication protocol Layer 1 may be used to indicate the resource(s) to be used in communication protocol Layer 3.

As represented by block 206, at some point in time, a determination is made to handover an access terminal. For example, in accordance with conventional practice, handover may be initiated when the signal from a potential target access point for the access terminal is better than (e.g., by a threshold amount) the signal quality the access terminal receives from a serving access point.

As represented by block 208, as a result of the determination of block 206, a handover command is transmitted over the reserved resource (from block 202). Consequently, an access terminal monitoring this resource may efficiently acquire the handover command.

For purposes of illustration, various aspects of the disclosure will now be described in more detail in conjunction with FIGS. 3 and 4. In this example, an access point in the form of a base station hands-over an access terminal in the form of a UE.

Figure 3:
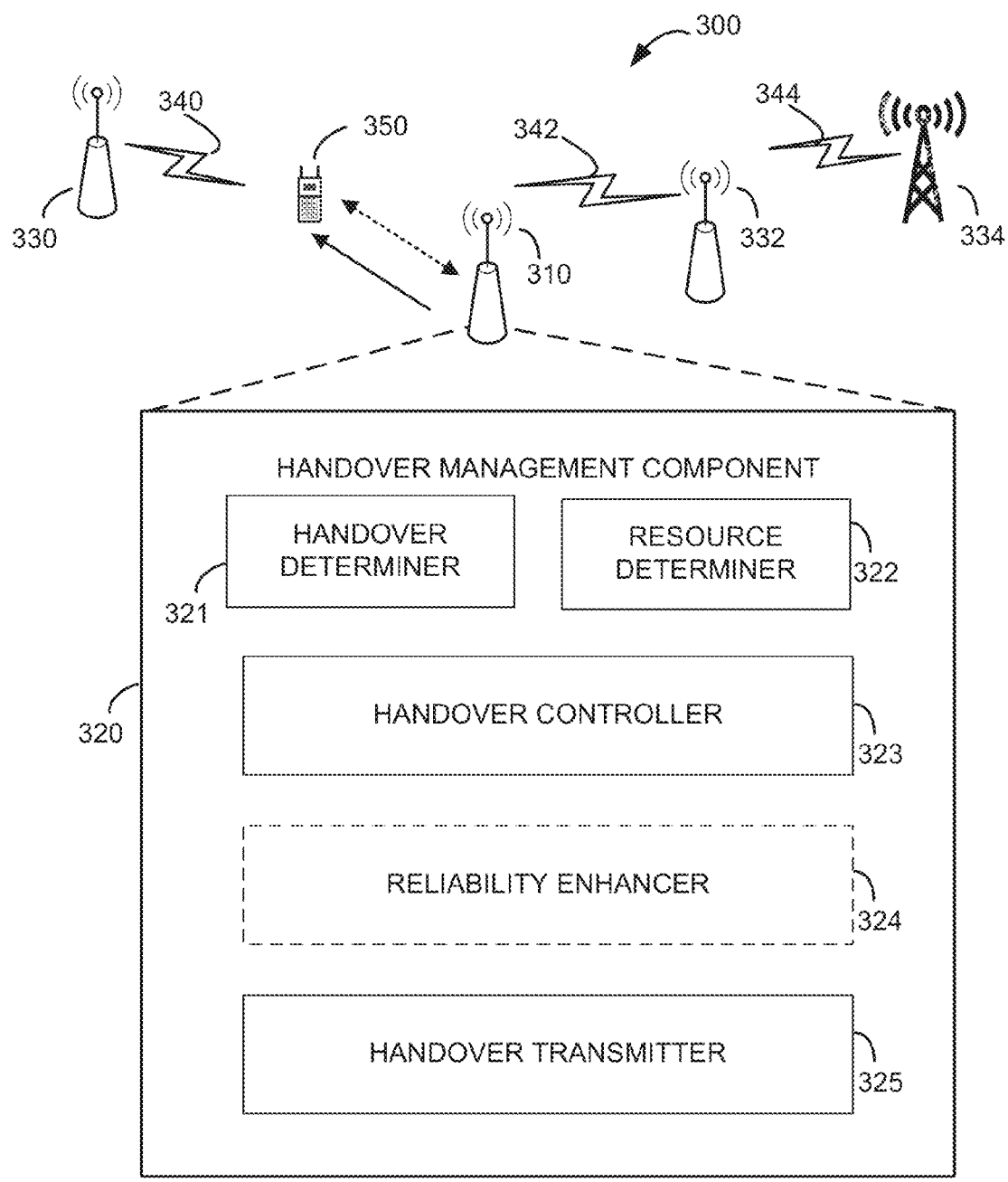
FIG. 3 is a simplified diagram illustrating an apparatus for handover signaling in a wireless communication system.

Referring to FIG. 3, an apparatus for handover signaling in a wireless communication system 300 includes a base station 310 having a handover management component 320 configured to reserve physical resource blocks (PRB) to improve handover signaling reliability in a network environment that includes a number of base stations, such as base stations 330, 332, and 334, that are densely located within the network environment. Each of the base stations may be transmitting signals, such as signals 340, 342, and 344, causing interference with one another and at a user equipment (UE) in the vicinity, such as UE 350. Operation of base station 310 with the handover management component 320 can improve reliability of handover operations by transmitting handover signaling over the reserved physical resource blocks, or reserved resources. Otherwise, less reliability may occur due to interference between the densely located base stations.

In an aspect, for example, handover management component 320 includes handover determiner 321 configured to identify when a handover is needed. For example, handover determiner 321 may optionally be configured to receive a measurement report from UE 350 via a communication session between UE 350 and base station 310, such as when UE 350 is engaged in an active call. In this example, base station 310 is the serving, or source, base station for UE 350. The measurement report may include identifiers for one or more neighbor base stations, such as base stations 330, 332, and 334, and measured signal parameters for the identified base stations as received and determined by UE 350. Handover determiner 321 can determine to handover the active call of UE 350 to one of the base stations identified in the measurement report, e.g. a target base station. For example, in an aspect, handover determiner 321 may be configured to select one of base stations 330, 332, and 334, as identified in the measurement report, as a target base station for receiving the handover from the UE 350 based on the values of one or more measured signal parameters for the target base station exceeding a handover threshold.

Handover management component 320 also includes resource determiner 322 configured to determine a reserved resource for handover communications with UE 350. In one example, the reserved resource determined by resource determiner 322 may be pre-determined based on a network-wide configuration. In another example, the reserved resource may be pre-determined based on communication between the neighbor base stations, such as base stations 330, 332, and 334. In yet another example, the reserved resource may be determined by resource determiner 322 in response to receipt of the measurement report by handover determiner 321. Further, for example, the reserved resource may be a frequency domain resource or a time domain resource. Moreover, for instance, the reserved resource may include one or more reserved physical resource blocks (PRBs). Additionally, the reserved resource may be a resource defined in the physical downlink shared channel (PDSCH). In one example, the reserved resource may be provided to UE 350 (i.e., would be known to UE 350) in advance of a time slot in which the transmission of the handover command is made.

Handover management component 320 also includes handover controller 323 configured to communicate with handover determiner 321 and resource determiner 322 to manage performance of the handover. Handover determiner 321 may notify handover controller 323 that it has determined to handover the active call of UE 350. In response to this notification, handover controller 323 may communicate with resource determiner 322 to request the reserved resource. Handover controller 323 may optionally be configured to generate a resource grant for UE 350 that includes the reserved resource and timing information for when the handover process will begin. For example, the resource grant may provide UE 350 with information about the reserved resource at a time prior to the start of the handover process.

Handover management component 320 also includes handover transmitter 325. Handover transmitter 325 may be configured to communicate with handover controller 323, handover determiner 321 and resource determiner 322. Handover transmitter 325 may be configured to receive a notification from handover controller 323 that the active call of UE 350 is to begin the handover process. Handover transmitter 325 may optionally be configured to receive the resource grant for UE 350 from handover controller 323 and transmit the resource grant to UE 350 in advance of a time slot in which the handover process may begin. Additionally, handover transmitter 325 is configured to transmit a handover command to UE 350 over the reserved resource. In one example, the handover command may include an identifier associated with the base station identified by handover determiner 321 as the target base station for receiving the handover. In another example, a target base station identifier may be included in the resource grant. Handover transmitter 325 may be further configured to transmit the handover command to UE 350 on the physical downlink shared channel (PDSCH).

Handover management component 320 may optionally include reliability enhancer 324 to further improve reliability of the handover process. For instance, reliability enhancer 324 may enhance reliability of the transmission of the handover command, and in some instances, resource grant, to UE 350 over the PDSCH. In one example, reliability enhancer 324 may improve reliability by boosting the power of the PDSCH. In another example, reliability enhancer 324 may improve reliability by reducing interference based on a fixed configuration, such as PDSCH on certain fixed orthogonal frequency-division multiplexing (OFDM) symbols or resources, fixing signal rank, and/or modulating the order of signals.

Figure 4:
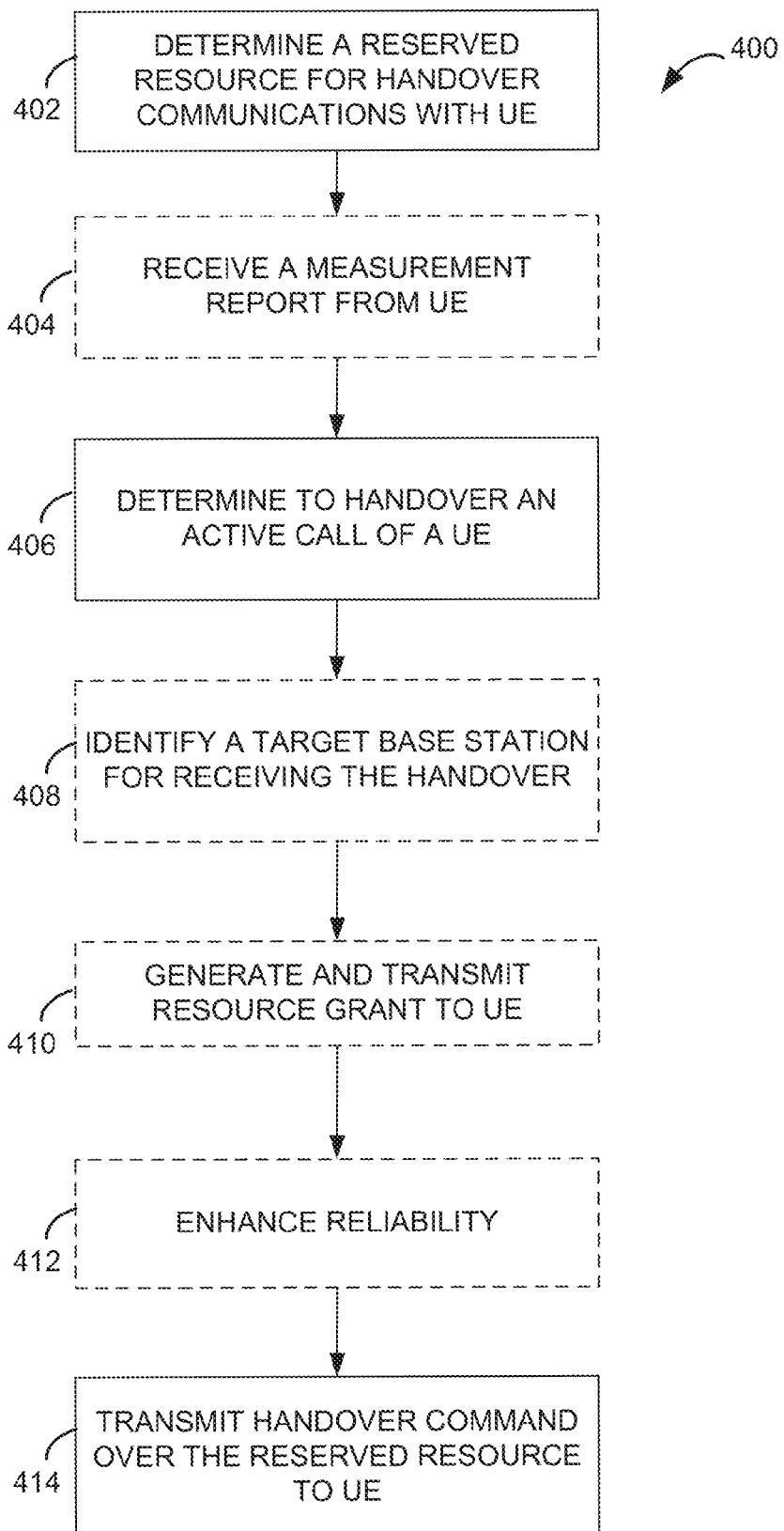
FIG. 4 is flowchart of several sample aspects of operations that may be performed in conjunction with handover signaling in a wireless communication system.

Referring to FIG. 4, a method 400 for handover signaling in a wireless communication system is shown. At 402, the method 400 includes determining a reserved resource for handover communications with a UE. For example, resource determiner 322 may be configured to determine a reserved resource for handover communications with UE 350. In one example, the reserved resource determined by resource determiner 322 may be pre-determined based on a network-wide configuration. In another example, the reserved resource may be pre-determined based on communication between the neighbor base stations, such as base stations 330, 332, and 334. The reserved resource may be a frequency domain resource or a time domain resource.

Optionally at 404, the method includes receiving a measurement report from a UE. For example, handover determiner 321 of FIG. 1 may receive a measurement report from UE 350 at a time when there is an open communication session between UE 350 and base station 310 such that UE 350 is engaged in an active call. In this example, base station 310 is the serving, or source, base station for UE 350. The measurement report may include identifiers for one or more neighbor base stations, such as base stations 330, 332, and 334, and measured signal parameters for the identified base stations.

At 406, the method 400 includes determining to handover an active call of a UE. For example, handover determiner 321 may determine to handover an active call of UE 350 to one of the base stations identified in the measurement report.

Optionally at 408, the method 400 includes identifying a target base station for receiving the handover. For example, handover determiner 321 may optionally be configured to select one of base stations 330, 332, and 334, as identified in the measurement report, as a target base station for receiving the handover from the UE 350 based on the measured signal parameters also included in the measurement report.

Optionally at 410, the method 400 includes generating and transmitting a resource grant to a UE. For example, handover controller 323 may optionally be configured to generate a resource grant for UE 350 that includes the reserved resource and timing information for when the handover process will begin. Handover transmitter 325 may be configured to receive a notification from handover controller 323 that the active call of UE 350 is to begin the handover process. Handover transmitter 325 may optionally be configured to receive the resource grant for UE 350 from handover controller 323 and transmit the resource grant to UE 350 prior to taking any further action.

Optionally at 412, the method 400 includes enhancing reliability of the handover process. For example, reliability enhancer 324 may optionally be included in handover management component 320 of base station 310. To further improve reliability of the handover process, reliability enhancer 324 may enhance reliability of the transmission of the handover command, and in some instances, resource grant, to UE 350 over the PDSCH. In one example, reliability enhancer 324 may improve reliability by adjusting the power of the reserved resource carrying the handover command. For example, the reliability enhancer 324 may boost power on one or more of the PDSCH and physical downlink control channel (PDCCH). In another example, reliability enhancer 324 may improve reliability based on a fixed configuration, such as PDSCH on certain fixed orthogonal frequency-division multiplexing (OFDM) symbols or resources, fixing signal rank, and/or modulating the order of signals. Using such a fixed configuration may allow UE 350 to decode signals more reliably.

At 414, the method 400 includes transmitting a handover command to a UE over the reserved resource. For example, handover transmitter 325 may be configured to communicate with handover controller 323, handover determiner 321 and resource determiner 322. Handover transmitter 325 may be configured to transmit a handover command to UE 350 over the reserved resource. In one example, the handover command may include an identifier associated with the base station identified by handover determiner 321 as the target base station for receiving the handover. In another example, a target base station identifier may be included in the resource grant. Handover transmitter 325 may be further configured to transmit the handover command to UE 350 on the physical downlink shared channel (PDSCH).

Referring now to FIGS. 5-8, additional aspects of the disclosure will be described in the context of an LTE-based network. It should be appreciated that the teachings herein may applicable to other multi-access technologies and the telecommunication standards that employ these technologies.

Figure 5:
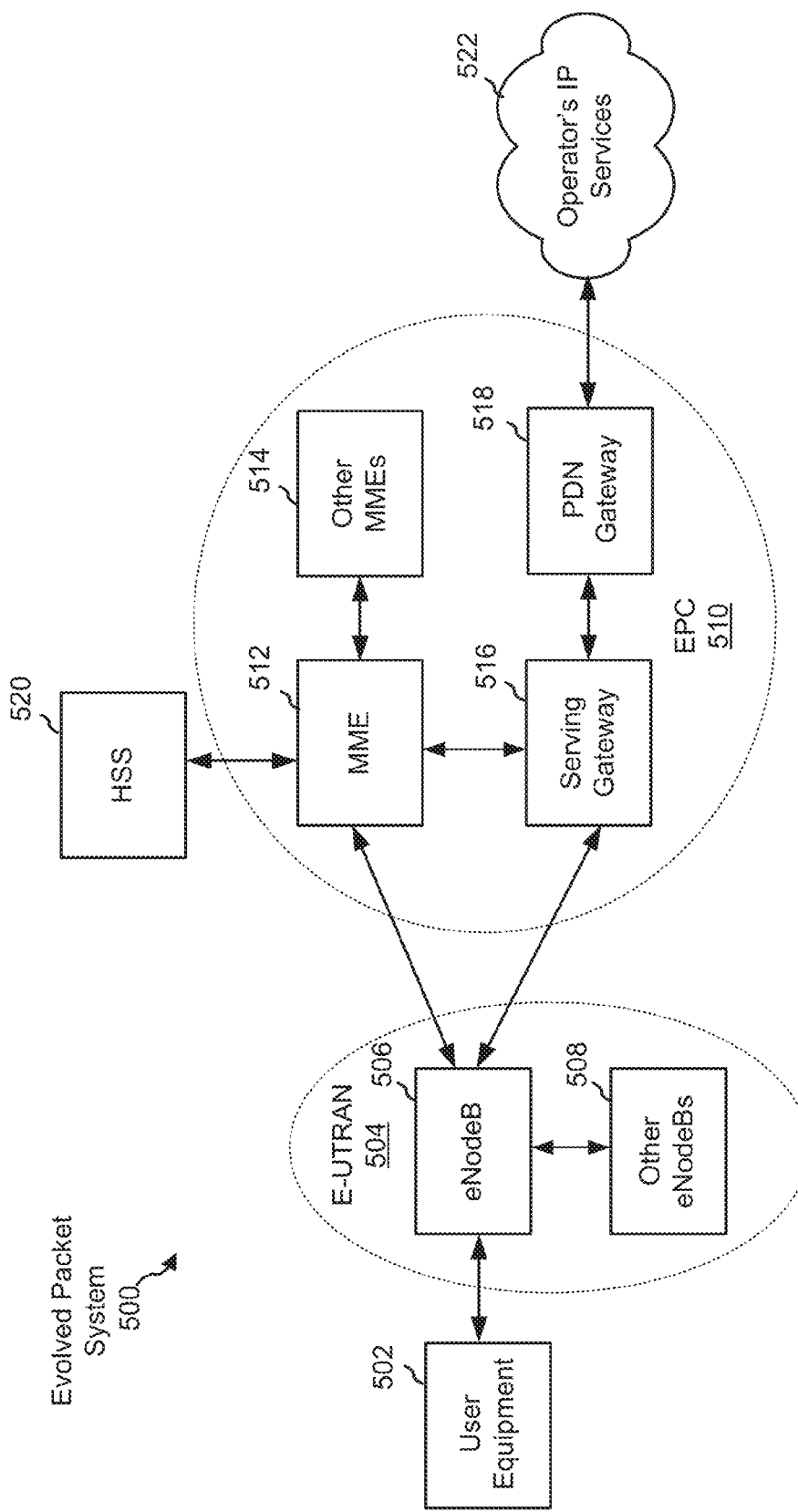
FIG. 5 is a simplified diagram illustrating an example of a network architecture.

FIG. 5 is a diagram illustrating an LTE network architecture 500 in which the handover management and handover signaling as taught herein may operate. The LTE network architecture 500 may be referred to as an Evolved Packet System (EPS) 500. The EPS 500 may include one or more user equipment (UE) 502, an Evolved UMTS Terrestrial Radio Access Network (E-UTRAN) 504, an Evolved Packet Core (EPC) 510, a Home Subscriber Server (HSS) 520, and an Operator's IP Services 522. The EPS can interconnect with other access networks, but for simplicity, those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 506 and other eNBs 508. The eNB 506 provides user and control planes protocol terminations toward the UE 502. The eNB 506 may be connected to the other eNBs 508 via a backhaul (e.g., an X2 interface). The eNB 506 may also be referred to as a base station, a base transceiver station, a radio base station, a radio transceiver, a transceiver function, a basic service set (BSS), an extended service set (ESS), or some other suitable terminology. The eNB 506 provides an access point to the EPC 510 for a UE 502. Examples of UEs 502 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 502 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 506 is connected by an S1 interface to the EPC 510. The EPC 510 includes a Mobility Management Entity (MME) 512, other MMEs 514, a Serving Gateway 516, and a Packet Data Network (PDN) Gateway 518. The MME 512 is the control node that processes the signaling between the UE 502 and the EPC 510. Generally, the MME 512 provides bearer and connection management. All user IP packets are transferred through the Serving Gateway 516, which itself is connected to the PDN Gateway 518. The PDN Gateway 518 provides UE IP address allocation as well as other functions. The PDN Gateway 518 is connected to the Operator's IP Services 522. The Operator's IP Services 522 may include the Internet, the Intranet, an IP Multimedia Subsystem (IMS), and a PS Streaming Service (PSS).

An access network in which handover management and handover signaling as taught herein may operate is typically divided into a number of cellular regions (cells). In this network, one or more lower power class eNBs may have cellular regions that overlap with one or more of the cells. The lower power class eNB may be a femto cell (e.g., home eNB (HeNB)), pico cell, micro cell, remote radio head (RRH), etc. Each macro eNB in the network is assigned to a respective cell and configured to provide an access point to the EPC for all the UEs in the cell. A centralized controller may or may not be used in different configurations. The eNBs are responsible for all radio related functions including radio bearer control, admission control, mobility control, scheduling, security, and connectivity to the serving gateway 516.

The modulation and multiple access scheme employed by the access network may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques (e.g., as discussed below). The actual wireless communication standard and the multiple access technology employed will depend on the specific application and the overall design constraints imposed on the system.

The eNBs may have multiple antennas supporting MIMO technology. The use of MIMO technology enables the eNBs to exploit the spatial domain to support spatial multiplexing, beamforming, and transmit diversity. Spatial multiplexing may be used to transmit different streams of data simultaneously on the same frequency. The data steams may be transmitted to a single UE to increase the data rate or to multiple UEs to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) with different spatial signatures, which enables each of the UE(s) to recover the one or more data streams destined for that UE. On the UL, each UE transmits a spatially precoded data stream, which enables the eNB to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 6:
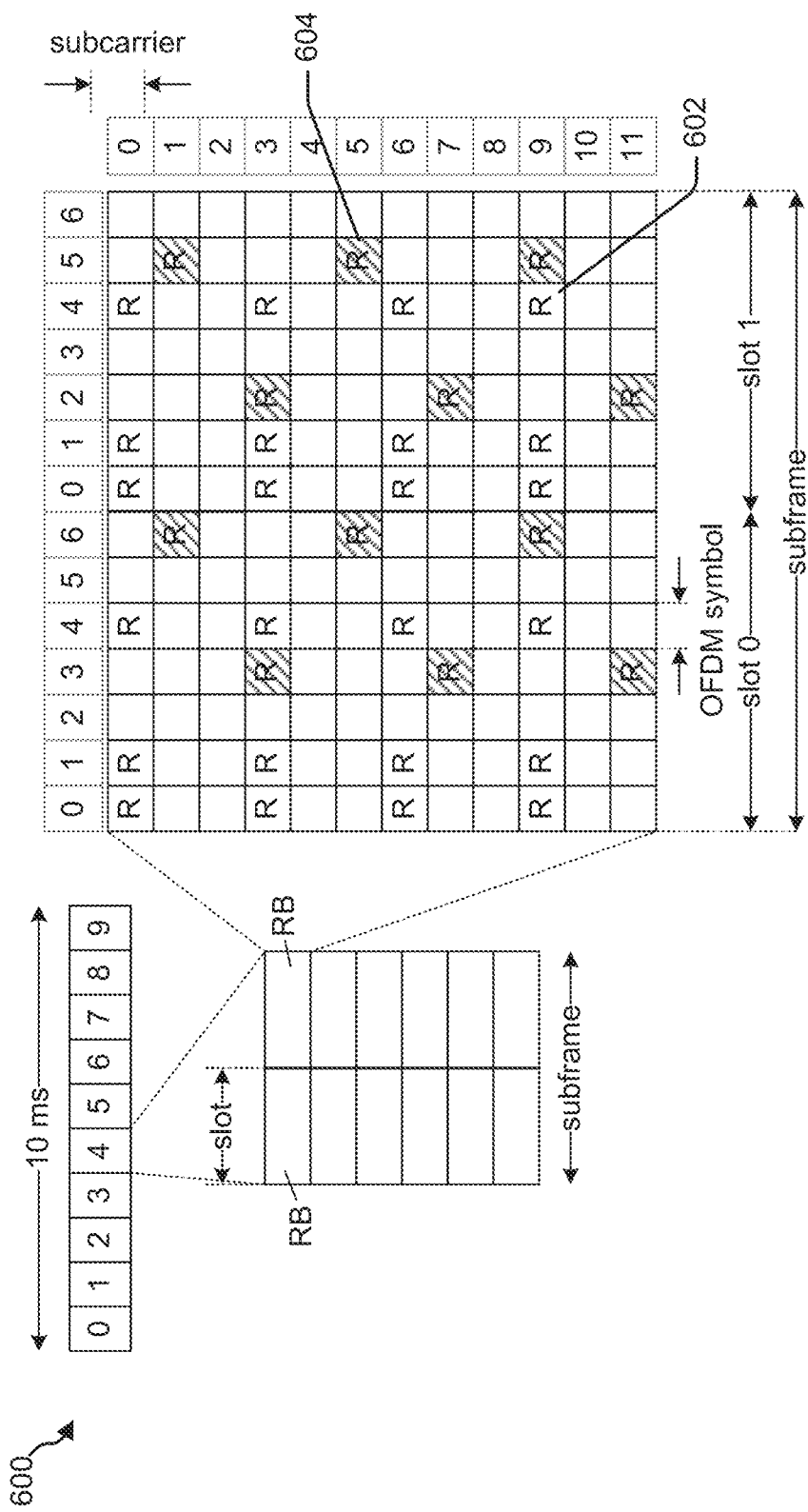
FIG. 6 is a simplified diagram illustrating an example of a DL frame structure in LTE.

FIG. 6 is a diagram 600 illustrating an example of a DL frame structure in LTE, which may be used for handover management and handover as taught herein. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 602, 604, include DL reference signals (DL-RS). The DL-RS include Cell-specific RS (CRS) (also sometimes called common RS) 602 and UE-specific RS (UE-RS) 604. UE-RS 604 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 2:
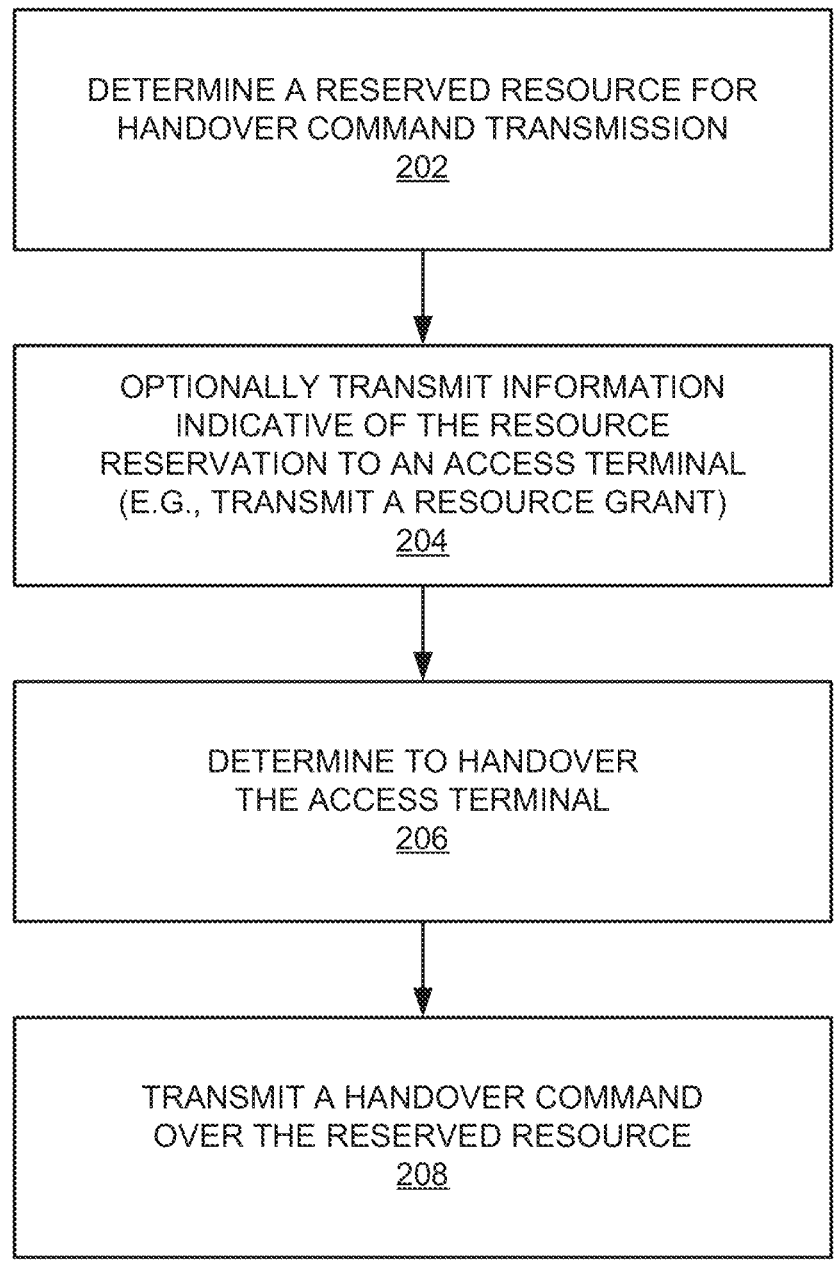
FIG. 2 is a flowchart of several sample aspects of operations that may be performed in conjunction with resource reservation and handover operations.
Figure 7:
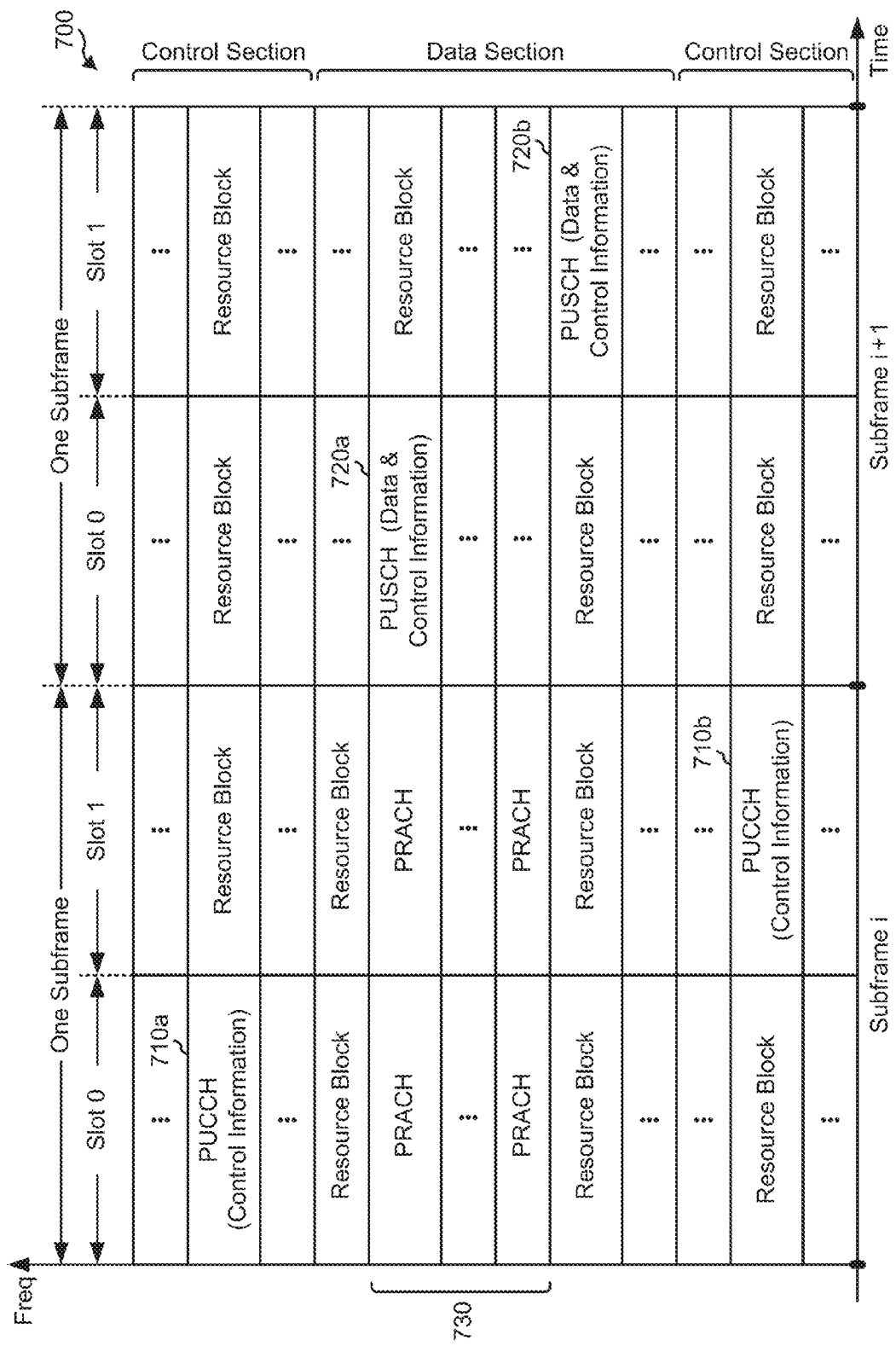
FIG. 7 is a simplified diagram illustrating an example of an UL frame structure in LTE.

FIG. 7 is a diagram 700 illustrating an example of an UL frame structure in LTE, which may be used by the handover management component and method for handover signaling of FIGS. 1 and 2. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 710*a*, 710*b* in the control section to transmit control information to an eNB. The UE may also be assigned resource blocks 720*a*, 720*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 730. The PRACH 730 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 8:
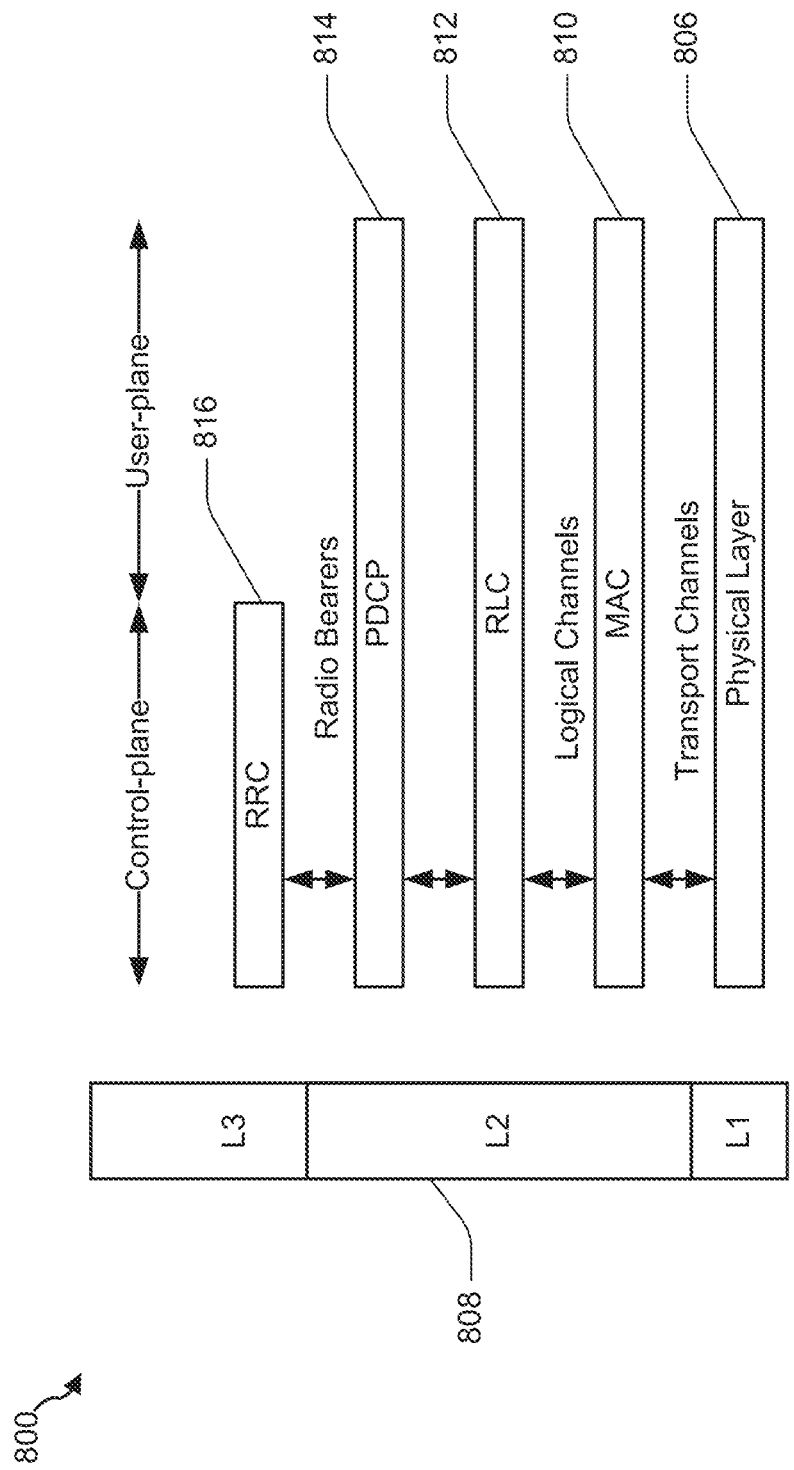
FIG. 8 is a simplified diagram illustrating an example of a radio protocol architecture for the user and control planes.

FIG. 8 is a diagram 800 illustrating an example of a radio protocol architecture for the user and control planes in LTE, which may be used by the handover management component and method for handover signaling of FIGS. 1 and 2. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 806. Layer 2 (L2 layer) 808 is above the physical layer 806 and is responsible for the link between the UE and eNB over the physical layer 806.

In the user plane, the L2 layer 808 includes a media access control (MAC) sublayer 810, a radio link control (RLC) sublayer 812, and a packet data convergence protocol (PDCP) 814 sublayer, which are terminated at the eNB on the network side. Although not shown, the UE may have several upper layers above the L2 layer 808 including a network layer (e.g., IP layer) that is terminated at the PDN gateway 518 on the network side, and an application layer that is terminated at the other end of the connection (e.g., far end UE, server, etc.).

The PDCP sublayer 814 provides multiplexing between different radio bearers and logical channels. The PDCP sublayer 814 also provides header compression for upper layer data packets to reduce radio transmission overhead, security by ciphering the data packets, and handover support for UEs between eNBs. The RLC sublayer 812 provides segmentation and reassembly of upper layer data packets, retransmission of lost data packets, and reordering of data packets to compensate for out-of-order reception due to hybrid automatic repeat request (HARQ). The MAC sublayer 810 provides multiplexing between logical and transport channels. The MAC sublayer 810 is also responsible for allocating the various radio resources (e.g., resource blocks) in one cell among the UEs. The MAC sublayer 810 is also responsible for HARQ operations.

In the control plane, the radio protocol architecture for the UE and eNB is substantially the same for the physical layer 806 and the L2 layer 808 with the exception that there is no header compression function for the control plane. The control plane also includes a radio resource control (RRC) sublayer 816 in Layer 3 (L3 layer). The RRC sublayer 816 is responsible for obtaining radio resources (i.e., radio bearers) and for configuring the lower layers using RRC signaling between the eNB and the UE.

Figure 9:
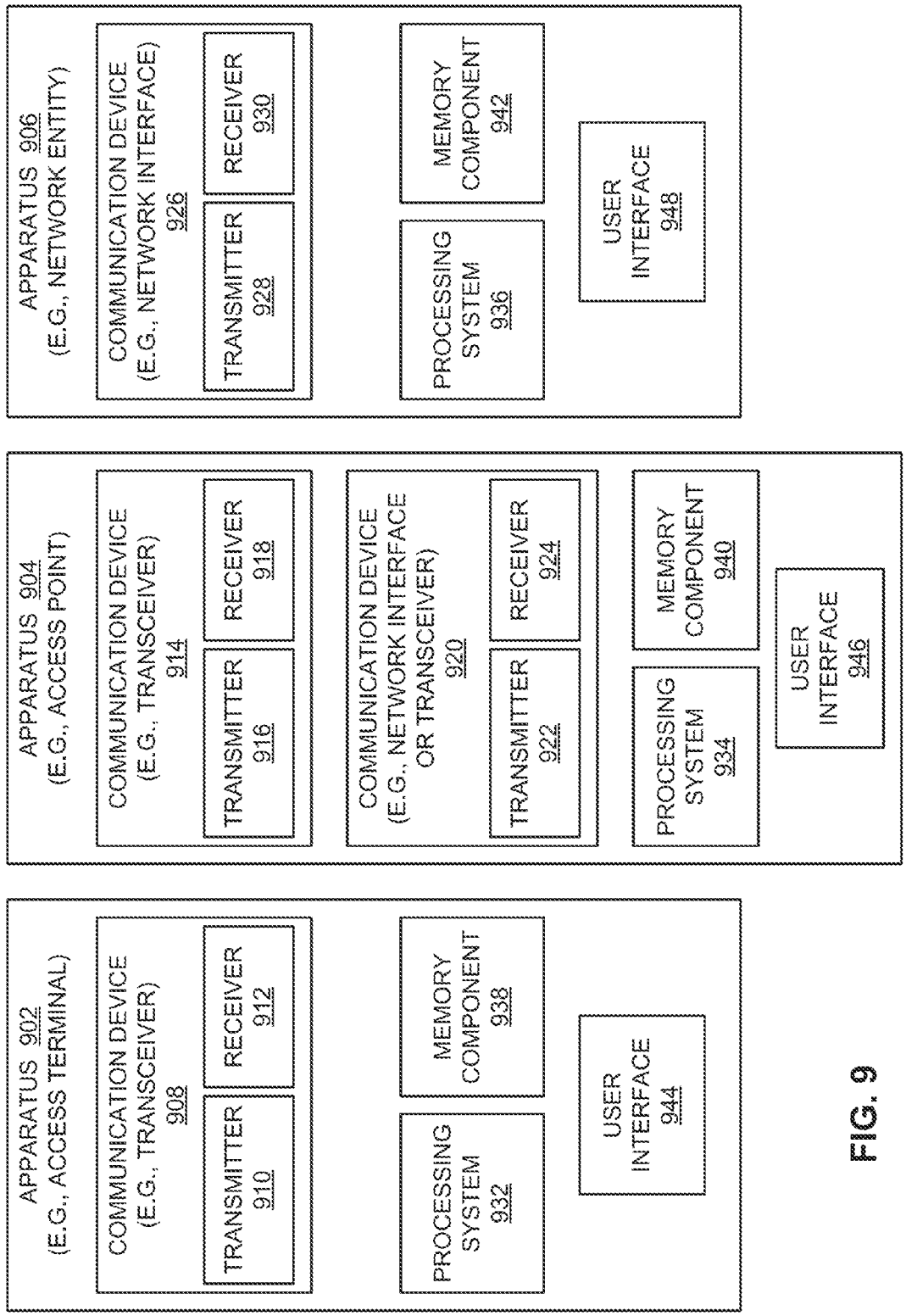
FIG. 9 is a simplified block diagram of several sample aspects of components that may be employed in communication nodes.

FIG. 9 illustrates several sample components (represented by corresponding blocks) that may be incorporated into an apparatus 902, an apparatus 904, and an apparatus 906 (e.g., corresponding to an access terminal, an access point, and a network entity, respectively) to perform resource reservation and handover operations as taught herein. It should be appreciated that these components may be implemented in different types of apparatuses in different implementations (e.g., in an ASIC, in a system on a chip (SoC), etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 902 and the apparatus 904 each include at least one wireless communication device (represented by the communication devices 908 and 914 (and the communication device 920 if the apparatus 904 is a relay)) for communicating with other nodes via at least one designated radio access technology. Each communication device 908 includes at least one transmitter (represented by the transmitter 910) for transmitting and encoding signals (e.g., messages, indications, information, and so on) and at least one receiver (represented by the receiver 912) for receiving and decoding signals (e.g., messages, indications, information, pilots, and so on). Similarly, each communication device 914 includes at least one transmitter (represented by the transmitter 916) for transmitting signals (e.g., messages, indications, information, pilots, and so on) and at least one receiver (represented by the receiver 918) for receiving signals (e.g., messages, indications, information, and so on). If the apparatus 904 is a relay access point, each communication device 920 may include at least one transmitter (represented by the transmitter 922) for transmitting signals (e.g., messages, indications, information, pilots, and so on) and at least one receiver (represented by the receiver 924) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 904 comprises a network listen module.

The apparatus 906 (and the apparatus 904 if it is not a relay access point) includes at least one communication device (represented by the communication device 926 and, optionally, 920) for communicating with other nodes. For example, the communication device 926 may comprise a network interface that is configured to communicate with one or more network entities via a wire-based or wireless backhaul. In some aspects, the communication device 926 may be implemented as a transceiver configured to support wire-based or wireless signal communication. This communication may involve, for example, sending and receiving: messages, parameters, or other types of information. Accordingly, in the example of FIG. 9, the communication device 926 is shown as comprising a transmitter 928 and a receiver 930. Similarly, if the apparatus 904 is not a relay access point, the communication device 920 may comprise a network interface that is configured to communicate with one or more network entities via a wire-based or wireless backhaul. As with the communication device 926, the communication device 920 is shown as comprising a transmitter 922 and a receiver 924.

The apparatuses 902, 904, and 906 also include other components that may be used in conjunction with resource reservation and handover operations as taught herein. The apparatus 902 includes a processing system 932 for providing functionality relating to, for example, handover operations as taught herein and for providing other processing functionality. The apparatus 904 includes a processing system 934 for providing functionality relating to, for example, resource reservation and handover operations as taught herein and for providing other processing functionality. The apparatus 906 includes a processing system 936 for providing functionality relating to, for example, resource reservation as taught herein and for providing other processing functionality. The apparatuses 902, 904, and 906 include memory devices 938, 940, and 942 (e.g., each including a memory device), respectively, for maintaining information (e.g., information indicative of reserved resources, thresholds, parameters, and so on). In addition, the apparatuses 902, 904, and 906 include user interface devices 944, 946, and 948, respectively, for providing indications (e.g., audible and/or visual indications) to a user and/or for receiving user input (e.g., upon user actuation of a sensing device such a keypad, a touch screen, a microphone, and so on).

For convenience, the apparatus 902 is shown in FIG. 9 as including components that may be used in the various examples described herein. In practice, the illustrated blocks may have different functionality in different aspects. For example, functionality of the block 934 for supporting the implementation of FIG. 2 may be different as compared to functionality of the block 934 for supporting the implementation of FIG. 4.

The components of FIG. 9 may be implemented in various ways. In some implementations, the components of FIG. 9 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 908, 932, 938, and 944 may be implemented by processor and memory component(s) of the apparatus 902 (e.g., by execution of appropriate code and/or by appropriate configuration of processor components). Similarly, some or all of the functionality represented by blocks 914, 920, 934, 940, and 946 may be implemented by processor and memory component(s) of the apparatus 904 (e.g., by execution of appropriate code and/or by appropriate configuration of processor components). Also, some or all of the functionality represented by blocks 926, 936, 942, and 948 may be implemented by processor and memory component(s) of the apparatus 906 (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a small cell. It should be appreciated that the teachings herein may be applicable to nodes associated with other types of coverage areas. For example, a pico access point may provide coverage (e.g., coverage within a commercial building) over an area that is smaller than a macro area and larger than a femto cell area. In various applications, other terminology may be used to reference a macro access point, a small cell, or other access point-type nodes. For example, a macro access point may be configured or referred to as an access node, base station, access point, eNodeB, macro cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 10:
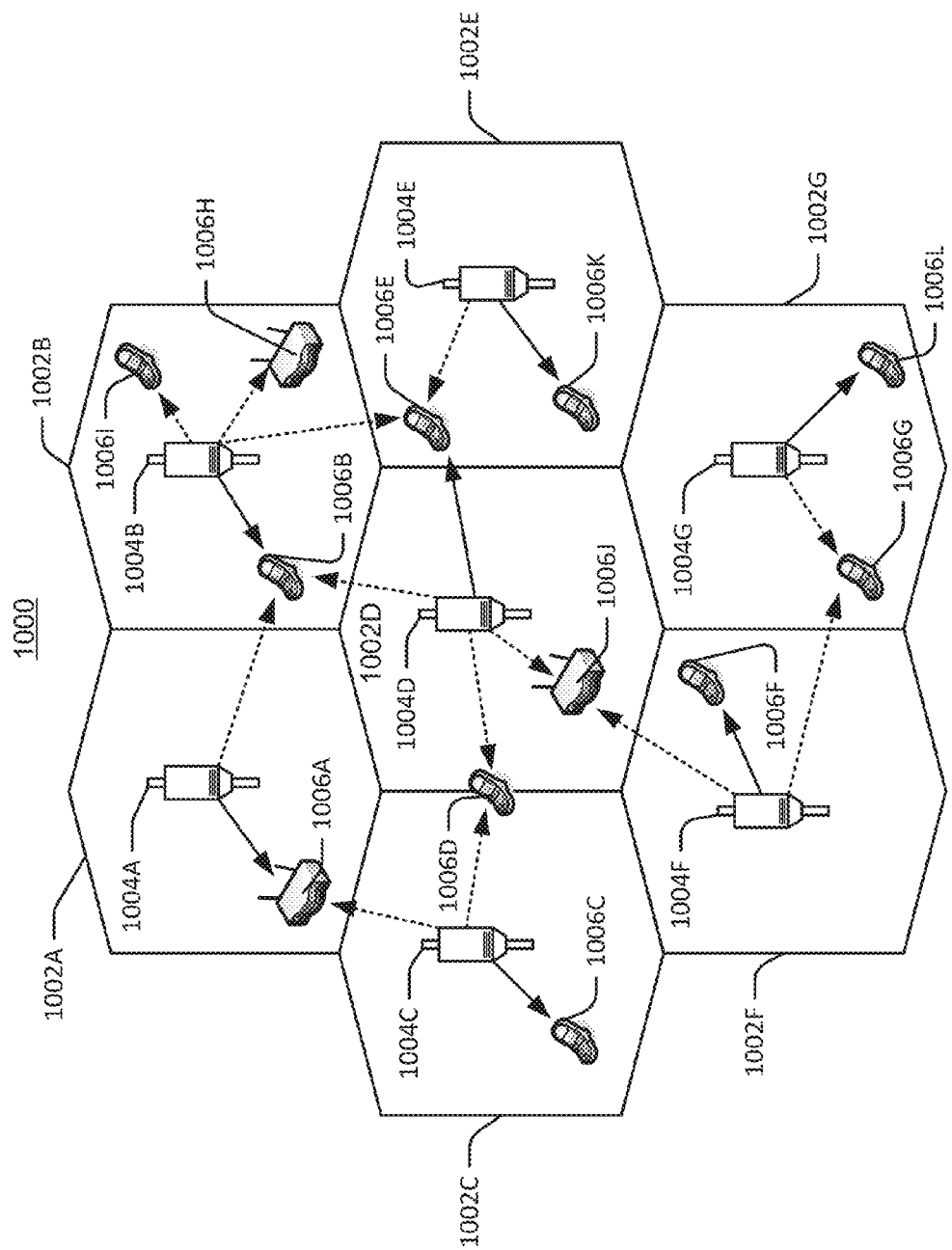
FIG. 10 is a simplified diagram of a wireless communication system.

FIG. 10 illustrates a wireless communication system 1000, configured to support a number of users, in which the teachings herein may be implemented. The system 1000 provides communication for multiple cells 1002, such as, for example, macro cells 1002A-1002G, with each cell being serviced by a corresponding access point 1004 (e.g., access points 1004A-1004G). As shown in FIG. 10, access terminals 1006 (e.g., access terminals 1006A-1006L) may be dispersed at various locations throughout the system over time. Each access terminal 1006 may communicate with one or more access points 1004 on a forward link (FL) and/or a reverse link (RL) at a given moment, depending upon whether the access terminal 1006 is active and whether it is in soft handoff, for example. The wireless communication system 1000 may provide service over a large geographic region. For example, macro cells 1002A-1002G may cover a few blocks in a neighborhood or several miles in a rural environment.

Figure 11:
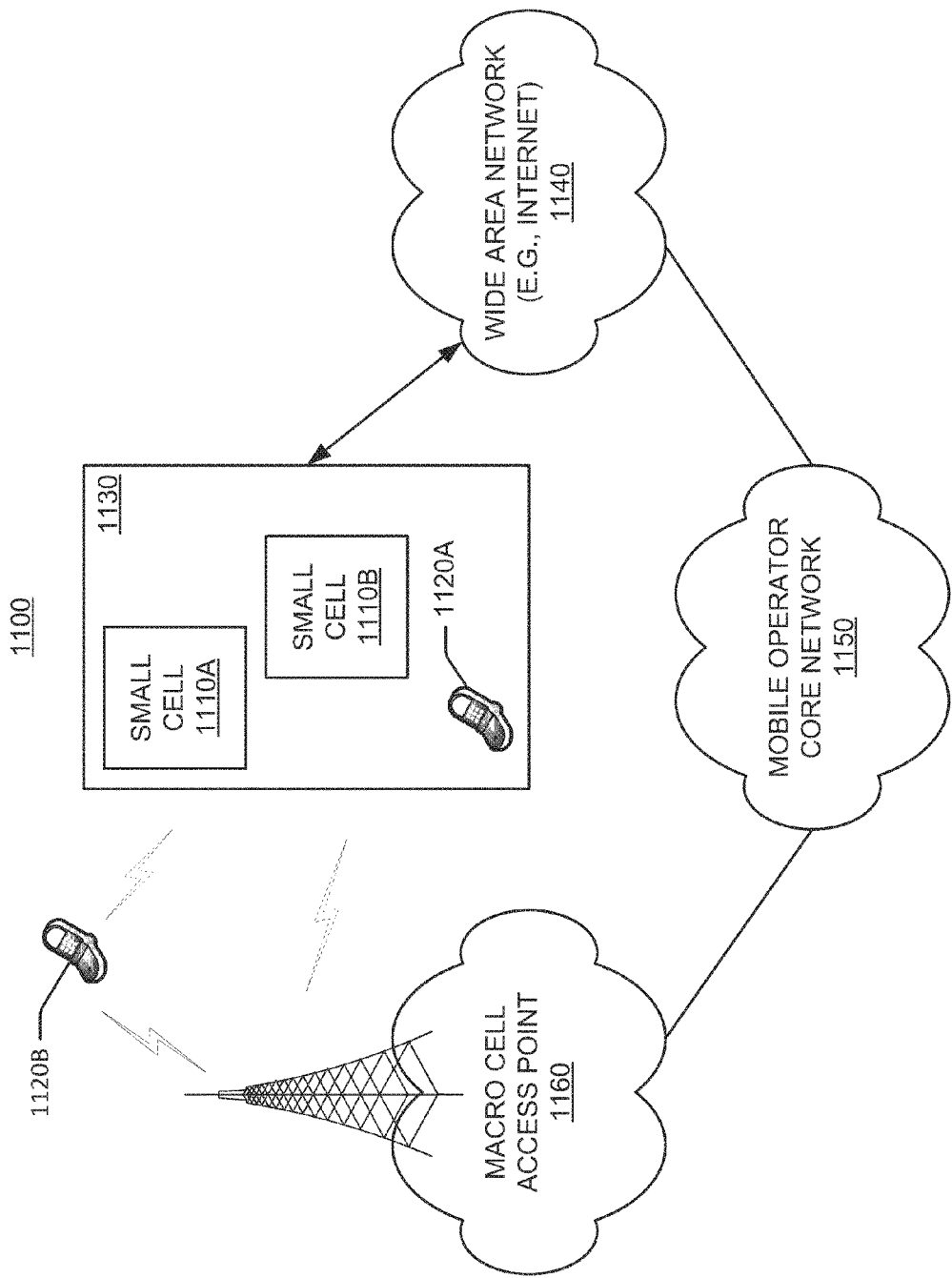
FIG. 11 is a simplified diagram of a wireless communication system including small cells.

FIG. 11 illustrates an example of a communication system 1100 where one or more small cells are deployed within a network environment. Specifically, the system 1100 includes multiple small cells 1110 (e.g., small cells 1110A and 1110B) installed in a relatively small scale network environment (e.g., in one or more user residences 1130). Each small cell 1110 may be coupled to a wide area network 1140 (e.g., the Internet) and a mobile operator core network 1150 via a DSL router, a cable modem, a wireless link, or other connectivity means (not shown). As will be discussed below, each small cell 1110 may be configured to serve associated access terminals 1120 (e.g., access terminal 1120A) and, optionally, other (e.g., hybrid or alien) access terminals 1120 (e.g., access terminal 1120B). In other words, access to small cells 1110 may be restricted whereby a given access terminal 1120 may be served by a set of designated (e.g., home) small cell(s) 1110 but may not be served by any non-designated small cells 1110 (e.g., a neighbor's small cell 1110).

Figure 12:
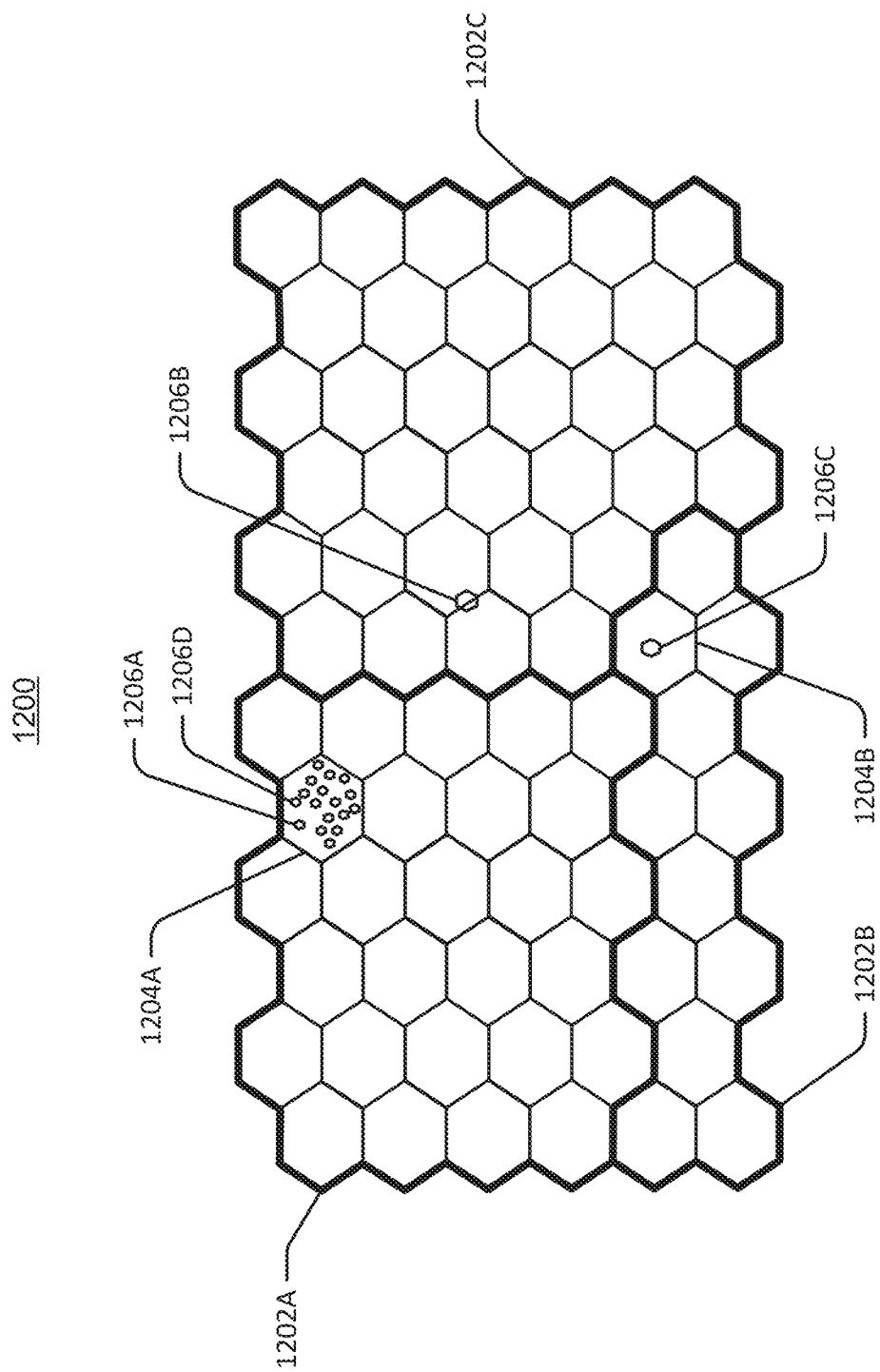
FIG. 12 is a simplified diagram illustrating coverage areas for wireless communication.

FIG. 12 illustrates an example of a coverage map 1200 where several tracking areas 1202 (or routing areas or location areas) are defined, each of which includes several macro coverage areas 1204. Here, areas of coverage associated with tracking areas 1202A, 1202B, and 1202C are delineated by the wide lines and the macro coverage areas 1204 are represented by the larger hexagons. The tracking areas 1202 also include femto coverage areas 1206. In this example, each of the femto coverage areas 1206 (e.g., femto coverage areas 1206B and 1206C) is depicted within one or more macro coverage areas 1204 (e.g., macro coverage areas 1204A and 1204B). It should be appreciated, however, that some or all of a femto coverage area 1206 might not lie within a macro coverage area 1204. In practice, a large number of femto coverage areas 1206 (e.g., femto coverage areas 1206A and 1206D) may be defined within a given tracking area 1202 or macro coverage area 1204. Also, one or more pico coverage areas (not shown) may be defined within a given tracking area 1202 or macro coverage area 1204.

Referring again to FIG. 11, the owner of a small cell 1110 may subscribe to mobile service, such as, for example, 3G mobile service, offered through the mobile operator core network 1150. In addition, an access terminal 1120 may be capable of operating both in macro environments and in smaller scale (e.g., residential) network environments. In other words, depending on the current location of the access terminal 1120, the access terminal 1120 may be served by a macro cell access point 1160 associated with the mobile operator core network 1150 or by any one of a set of small cells 1110 (e.g., the small cells 1110A and 1110B that reside within a corresponding user residence 1130). For example, when a subscriber is outside his home, he is served by a standard macro access point (e.g., access point 1160) and when the subscriber is at home, he is served by a small cell (e.g., small cell 1110A). Here, a small cell 1110 may be backward compatible with legacy access terminals 1120.

A small cell 1110 may be deployed on a single frequency or, in the alternative, on multiple frequencies. Depending on the particular configuration, the single frequency or one or more of the multiple frequencies may overlap with one or more frequencies used by a macro access point (e.g., access point 1160).

In some aspects, an access terminal 1120 may be configured to connect to a preferred small cell (e.g., the home small cell of the access terminal 1120) whenever such connectivity is possible. For example, whenever the access terminal 1120A is within the user's residence 1130, it may be desired that the access terminal 1120A communicate only with the home small cell 1110A or 1110B.

In some aspects, if the access terminal 1120 operates within the macro cellular network 1150 but is not residing on its most preferred network (e.g., as defined in a preferred roaming list), the access terminal 1120 may continue to search for the most preferred network (e.g., the preferred small cell 1110) using a better system reselection (BSR) procedure, which may involve a periodic scanning of available systems to determine whether better systems are currently available and subsequently acquire such preferred systems. The access terminal 1120 may limit the search for specific band and channel. For example, one or more femto channels may be defined whereby all small cells (or all restricted small cells) in a region operate on the femto channel(s). The search for the most preferred system may be repeated periodically. Upon discovery of a preferred small cell 1110, the access terminal 1120 selects the small cell 1110 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 1110 that reside within the corresponding user residence 1130). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., 911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

For convenience, the disclosure herein describes various functionality in the context of a small cell. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 13:
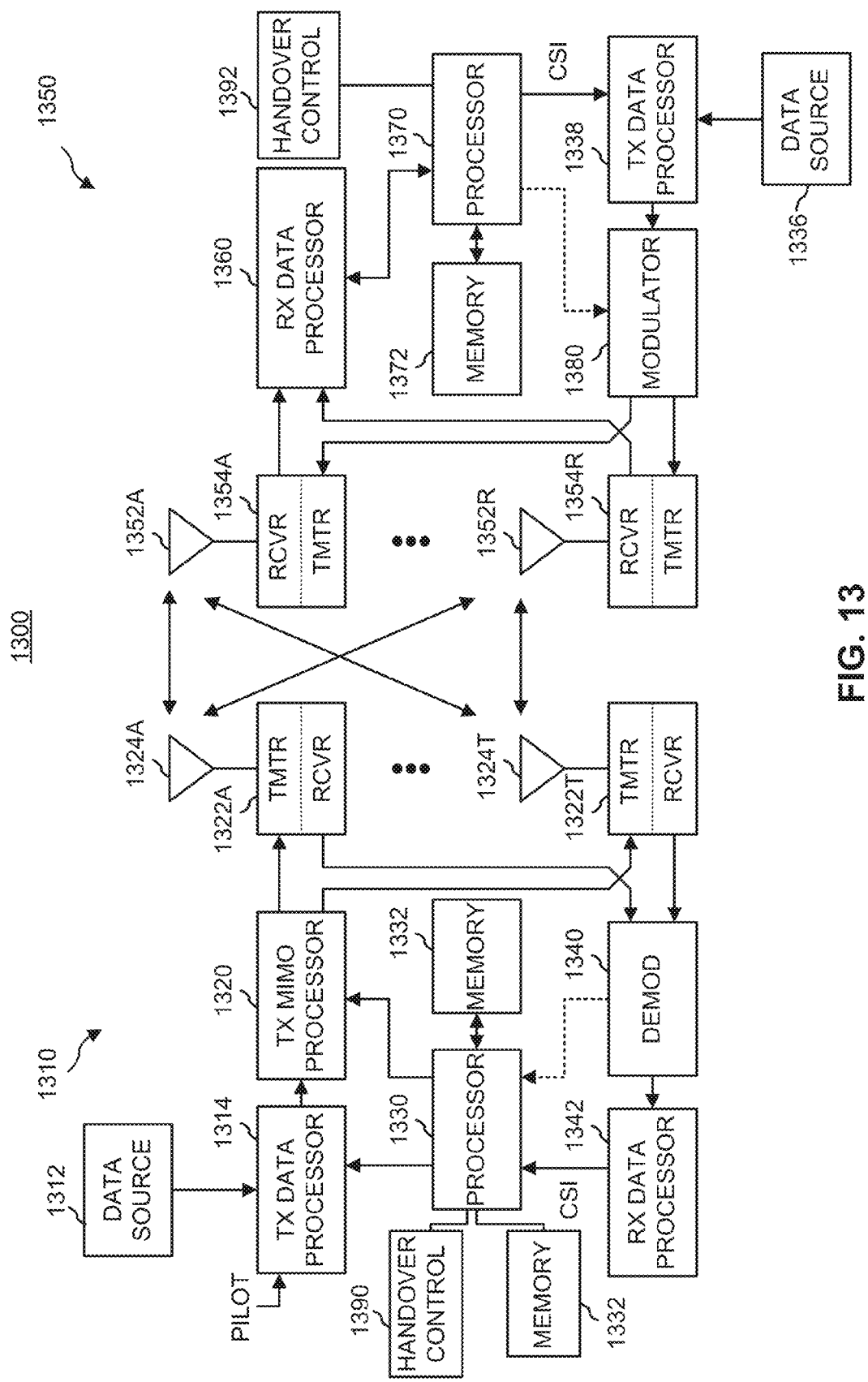
FIG. 13 is a simplified block diagram of several sample aspects of communication components.

FIG. 13 illustrates a wireless device 1310 (e.g., an access point) and a wireless device 1350 (e.g., an access terminal) of a sample MIMO system 1300. At the device 1310, traffic data for a number of data streams is provided from a data source 1312 to a transmit (TX) data processor 1314. Each data stream may then be transmitted over a respective transmit antenna.

The TX data processor 1314 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1330. A data memory 1332 may store program code, data, and other information used by the processor 1330 or other components of the device 1310.

The modulation symbols for all data streams are then provided to a TX MIMO processor 1320, which may further process the modulation symbols (e.g., for OFDM). The TX MIMO processor 1320 then provides $N_T$ modulation symbol streams to $N_T$ transceivers (XCVR) 1322A through 1322T. In some aspects, the TX MIMO processor 1320 applies beam-forming weights to the symbols of the data streams and to the antenna from which the symbol is being transmitted.

Each transceiver 1322 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1322A through 1322T are then transmitted from $N_T$ antennas 1324A through 1324T, respectively.

At the device 1350, the transmitted modulated signals are received by $N_R$ antennas 1352A through 1352R and the received signal from each antenna 1352 is provided to a respective transceiver (XCVR) 1354A through 1354R. Each transceiver 1354 conditions (e.g., filters, amplifies, and downconverts) a respective received signal, digitizes the conditioned signal to provide samples, and further processes the samples to provide a corresponding "received" symbol stream.

A receive (RX) data processor 1360 then receives and processes the $N_R$ received symbol streams from $N_R$ transceivers 1354 based on a particular receiver processing technique to provide $N_T$ "detected" symbol streams. The RX data processor 1360 then demodulates, deinterleaves, and decodes each detected symbol stream to recover the traffic data for the data stream. The processing by the RX data processor 1360 is complementary to that performed by the TX MIMO processor 1320 and the TX data processor 1314 at the device 1310.

A processor 1370 periodically determines which precoding matrix to use (discussed below). The processor 1370 formulates a reverse link message comprising a matrix index portion and a rank value portion. A data memory 1372 may store program code, data, and other information used by the processor 1370 or other components of the device 1350.

The reverse link message may comprise various types of information regarding the communication link and/or the received data stream. The reverse link message is then processed by a TX data processor 1338, which also receives traffic data for a number of data streams from a data source 1336, modulated by a modulator 1380, conditioned by the transceivers 1354A through 1354R, and transmitted back to the device 1310.

At the device 1310, the modulated signals from the device 1350 are received by the antennas 1324, conditioned by the transceivers 1322, demodulated by a demodulator (DEMOD) 1340, and processed by a RX data processor 1342 to extract the reverse link message transmitted by the device 1350. The processor 1330 then determines which pre-coding matrix to use for determining the beam-forming weights then processes the extracted message.

FIG. 13 also illustrates that the communication components may include one or more components that perform handover-related control operations (e.g., including resource reservation) as taught herein. For example, a handover control component 1390 may cooperate with the processor 1330 and/or other components of the device 1310 to hand-over another device (e.g., device 1350) as taught herein. Similarly, a handover control component 1392 may cooperate with the processor 1370 and/or other components of the device 1350 to be handed-over from or to another device (e.g., device 1310). It should be appreciated that for each device 1310 and 1350 the functionality of two or more of the described components may be provided by a single component. For example, a single processing component may provide the functionality of the handover control component 1390 and the processor 1330 and a single processing component may provide the functionality of the handover control component 1392 and the processor 1370.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1×RTT, 1×EV-DO Rel0, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects, a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects, the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims.

Figure 14:
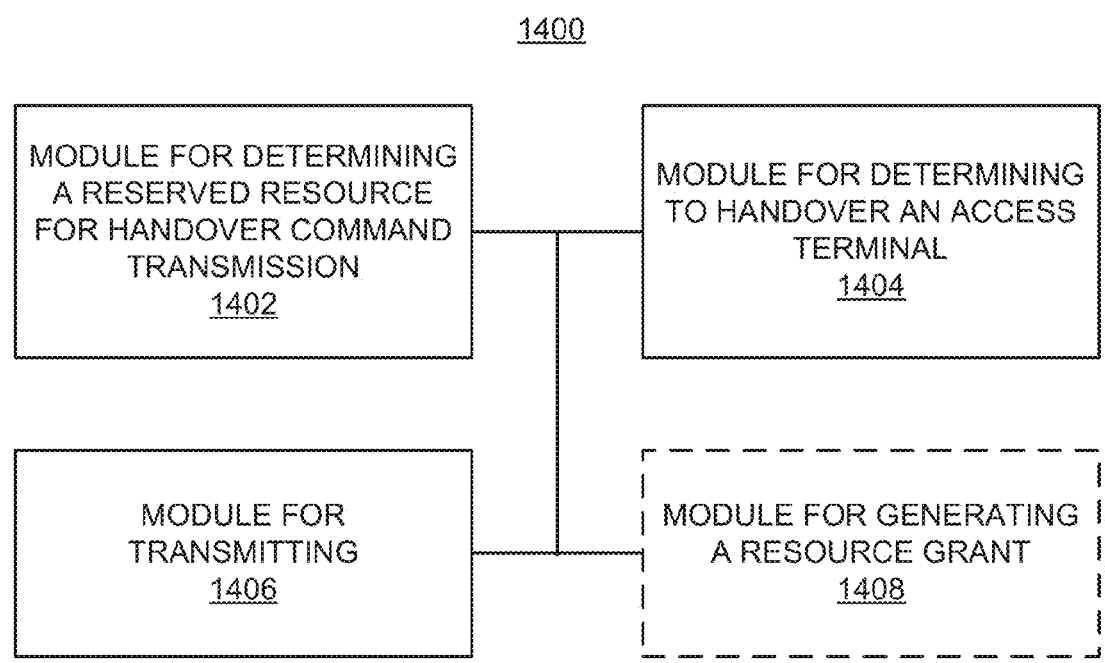
FIG. 14 is a simplified block diagram of several sample aspects of an apparatus configured to support resource reservation as taught herein.

Referring to FIG. 14, an apparatus 1400 is represented as a series of interrelated functional modules. A module for determining a reserved resource for handover command transmission 1402 may correspond at least in some aspects to, for example, a processing system as discussed herein. A module for determining to handover an access terminal 1404 may correspond at least in some aspects to, for example, a processing system as discussed herein. A module for transmitting 1406 may correspond at least in some aspects to, for example, a communication device (e.g., a transmitter) as discussed herein. A module for generating a resource grant 1408 may correspond at least in some aspects to, for example, a processing system as discussed herein.

The functionality of the modules of FIG. 14 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. As one specific example, the apparatus 1400 may comprise a single device (e.g., components 1402-1408 comprising different sections of an ASIC). As another specific example, the apparatus 1400 may comprise several devices (e.g., the components 1402, 1404, and 1408 comprising one ASIC and the component 1406 comprising another ASIC). The functionality of these modules also may be implemented in some other manner as taught herein. In some aspects one or more of any dashed blocks in FIG. 14 are optional.

In addition, the components and functions represented by FIG. 14 as well as other components and functions described herein, may be implemented using any suitable means. Such means also may be implemented, at least in part, using corresponding structure as taught herein. For example, the components described above in conjunction with the "module for" components of FIG. 14 also may correspond to similarly designated "means for" functionality. Thus, in some aspects one or more of such means may be implemented using one or more of processor components, integrated circuits, or other suitable structure as taught herein. Several examples follow. In some aspects, means for determining comprises a processing system, means for defining comprises a processing system, and means for sending comprises a communication device.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm operations described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of operations in any disclosed process is an example of a sample approach. Based upon design preferences, it is understood that the specific order or hierarchy of operations in the processes may be rearranged while remaining within the scope of the present disclosure. The accompanying method claims present elements of the various operations in a sample order, and are not meant to be limited to the specific order or hierarchy presented.

The operations of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code(s) executable (e.g., executable by at least one computer) to provide functionality relating to one or more of the aspects of the disclosure. In some aspects, a computer program product may comprise packaging materials.

In one or more implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for wireless communication, comprising:
at least one processor;

at least one memory coupled to the at least one processor, the at least one processor and the at least one memory being configured to determine a reserved resource for handover command transmission, and further configured to determine to handover an access terminal, wherein the determination to handover the access terminal occurs after the determination of the reserved resource; and a transmitter configured to transmit a handover command over the reserved resource to the access terminal as a result of the determination to handover the access terminal.

2. The apparatus of claim 1, wherein the at least one processor and the at least one memory are configured to determine the reserved resource by storing information indicative of the reserved resource.

3. The apparatus of claim 1, wherein the at least one processor and the at least one memory are configured to determine the reserved resource by communicating with at least one access point of a cluster of access points to select the reserved resource.

4. The apparatus of claim 1, wherein the at least one processor and the at least one memory are configured to determine the reserved resource by receiving information indicative of the reserved resource.

5. The apparatus of claim 1, wherein the at least one processor and the at least one memory are configured to determine the reserved resource by determining a pre-determined reserved resource.

6. The apparatus of claim 5, wherein the at least one processor and the at least one memory are configured to determine the pre-determined reserved resource by determining a network-wide configuration.

7. The apparatus of claim 5, wherein:
different pre-determined reserved resources are defined for different clusters of access points; and
the at least one processor and the at least one memory are configured to determine the pre-determined reserved resource by identifying one of the clusters and determining which one of the pre-determined reserved resources is defined for the identified cluster.

8. The apparatus of claim 1, wherein:
the at least one processor and the at least one memory is further configured to generate a resource grant;
the resource grant includes information about the reserved resource and handover timing information; and
the transmitter is further configured to transmit the resource grant to the access terminal prior to the transmission of the handover command.

9. The apparatus of claim 1, wherein the transmitter is further configured to transmit information indicative of the reserved resource to the access terminal prior to the transmission of the handover command.

10. The apparatus of claim 1, wherein information indicative of the reserved resource is stored at the access terminal in advance of a time slot in which the transmission of the handover command occurs.

11. The apparatus of claim 1, wherein the reserved resource is a frequency domain resource.

12. The apparatus of claim 1, wherein the reserved resource is a time domain resource.

13. The apparatus of claim 1, wherein the reserved resource is a Long Term Evolution (LTE) physical resource block.

14. The apparatus of claim 1, the at least one processor and the at least one memory being configured to determine the reserved resource prior to any handovers.

15. The apparatus of claim 1, the at least one processor and the at least one memory being further configured to determine the reserved resource for a plurality of wireless nodes.

16. A method of wireless communication, comprising:
determining a reserved resource for handover command transmission;
determining to handover an access terminal, wherein the determining to handover the access terminal occurs after the determining of the reserved resource; and
transmitting a handover command over the reserved resource to the access terminal as a result of the determining to handover the access terminal.

17. The method of claim 16, wherein the determining of the reserved resource comprises storing information indicative of the reserved resource.

18. The method of claim 16, wherein the determining of the reserved resource comprises communicating with at least one access point of a cluster of access points to select the reserved resource.

19. The method of claim 16, wherein the determining of the reserved resource comprises receiving information indicative of the reserved resource.

20. The method of claim 16, wherein the determining of the reserved resource comprises determining a pre-determined reserved resource.

21. The method of claim 20, wherein the determining of the pre-determined reserved resource comprises determining a network-wide configuration.

22. The method of claim 20, wherein:
different pre-determined reserved resources are defined for different clusters of access points; and
the determining of the pre-determined reserved resource comprises identifying one of the clusters and determining which one of the pre-determined reserved resources is defined for the identified cluster.

23. The method of claim 16, further comprising:
generating a resource grant, wherein the resource grant includes information about the reserved resource and handover timing information; and
transmitting the resource grant to the access terminal prior to the transmission of the handover command.

24. The method of claim 16, further comprising transmitting information indicative of the reserved resource to the access terminal prior to the transmission of the handover command.

25. The method of claim 16, wherein information indicative of the reserved resource is stored at the access terminal in advance of a time slot in which the transmission of the handover command occurs.

26. The method of claim 16, wherein the reserved resource is a frequency domain resource.

27. The method of claim 16, wherein the reserved resource is a time domain resource.

28. The method of claim 16, wherein the reserved resource is a Long Term Evolution (LTE) physical resource block.

29. An apparatus for wireless communication, comprising:
means for determining a reserved resource for handover command transmission;
means for determining to handover an access terminal, wherein the determination to handover the access terminal occurs after the determination of the reserved resource; and means for transmitting a handover command over the reserved resource to the access terminal as a result of the determination to handover the access terminal.

30. The apparatus of claim 29, wherein information indicative of the reserved resource is stored at the access terminal in advance of a time slot in which the transmission of the handover command occurs.

31. A non-transitory computer-readable medium comprising code that causes a computer to:
   determine a reserved resource for handover command transmission;
   determine to handover an access terminal, wherein the determination to handover the access terminal occurs after the determination of the reserved resource; and
   transmit a handover command over the reserved resource to the access terminal as a result of the determination to handover the access terminal.

32. The non-transitory computer-readable medium of claim 31, wherein information indicative of the reserved resource is stored at the access terminal in advance of a time slot in which the transmission of the handover command occurs.

* * * * *